(12) United States Patent
Fourtet et al.

(10) Patent No.: US 10,645,555 B2
(45) Date of Patent: May 5, 2020

(54) METHOD FOR RECEIVING A BROADCAST SIGNAL COMPRISING A PILOT SIGNAL AND AN INFORMATION SIGNAL

(71) Applicant: SIGFOX, Labege (FR)

(72) Inventors: Christophe Fourtet, Pompignan (FR); Lionel Zirphile, Ramonville Saint Agne (FR)

(73) Assignee: SIGFOX, Labege (FR)

( * ) Notice: Subject to any disclaimer, the term of this patent is extended or adjusted under 35 U.S.C. 154(b) by 0 days.

(21) Appl. No.: 16/660,163

(22) Filed: Oct. 22, 2019

(65) Prior Publication Data

US 2020/0053535 A1 Feb. 13, 2020

Related U.S. Application Data

(62) Division of application No. 15/577,763, filed as application No. PCT/FR2016/051267 on May 27, 2016.

(30) Foreign Application Priority Data

May 29, 2015 (FR) ...................... 15 54890

(51) Int. Cl.
| | |
|---|---|
| *H04W 4/70* | (2018.01) |
| *H04W 72/00* | (2009.01) |
| *H04L 27/36* | (2006.01) |
| *H04W 4/06* | (2009.01) |
| *H04W 4/08* | (2009.01) |
| *H04W 48/10* | (2009.01) |

(52) U.S. Cl.
CPC ............ *H04W 4/70* (2018.02); *H04L 27/368* (2013.01); *H04W 4/06* (2013.01); *H04W 4/08* (2013.01); *H04W 72/005* (2013.01); *H04W 48/10* (2013.01)

(58) Field of Classification Search
CPC ....... H04W 4/90; H04W 16/14; H04W 48/10; H04W 88/06; H04W 24/10; H04W 48/06; H04W 48/18; H04W 4/02; H04W 4/06; H04W 72/042; H04W 74/04; H04W 76/50; H04W 84/045; H04W 88/10; H04W 8/06; H04W 28/08; H04W 36/14; H04W 36/22
USPC ......................................................... 455/65
See application file for complete search history.

(56) References Cited

U.S. PATENT DOCUMENTS

| 4,403,113 | A * | 9/1983 | Ogita .................. H03D 1/2236 |
| | | | 327/126 |
| 2003/0092406 | A1* | 5/2003 | Ito ........................ H04B 1/1661 |
| | | | 455/126 |
| 2012/0322440 | A1 | 12/2012 | Jeong et al. |

(Continued)

FOREIGN PATENT DOCUMENTS

WO 2015/043779 A1 4/2015

*Primary Examiner* — Ajibola A Akinyemi
(74) *Attorney, Agent, or Firm* — Im IP Law; Chai Im; C. Andrew Im (57) ABSTRACT

A method for receiving a broadcast signal by an access network to a plurality of terminals of a two-way wireless communication system. An information signal is formed from the broadcast information destined for the terminals. A pilot signal is formed and a broadcast signal including the information signal SI1 and the pilot signal is transmitted. The information signal and the pilot signal are transmitted on different respective central frequencies having a predefined frequency gap.

3 Claims, 2 Drawing Sheets

(56) References Cited

U.S. PATENT DOCUMENTS

2013/0165060 A1    6/2013  Jian et al.
2015/0138995 A1*  5/2015  NarayanaMoorthy ....................... H04L 5/0048
                                                                    370/252

* cited by examiner

METHOD FOR RECEIVING A BROADCAST SIGNAL COMPRISING A PILOT SIGNAL AND AN INFORMATION SIGNAL

RELATED APPLICATIONS

This application is divisional of U.S. application Ser. No. 15/577,763 filed Nov. 28, 2017, which is a § 371 application from PCT/FR2016/051267 filed May 27, 2016, which claims priority from French Patent Application No. 15 54890 filed May 29, 2015, each of which is incorporated herein by reference in its entirety

TECHNICAL FIELD

The present invention belongs to the field of wireless communication systems, and relates more particularly to a method for transmitting broadcast signals, using a group of base stations of an access network, to terminals, and to a method for receiving said broadcast signals.

STATE OF THE ART

The present invention finds a particularly advantageous, although by no means limiting, application in ultra-narrow-band wireless communication systems. The term "Ultra Narrow Band" (UNB) is understood to mean that the instantaneous frequency spectrum of the radio signals transmitted by the terminals to the access network has a frequency width of less than one kilohertz.

Such UNB wireless communication systems are particularly suitable for applications of M2M (acronym for "Machine-to-Machine") type or of "Internet of Things" (IoT) type.

In such a UNB wireless communication system, data exchanges are essentially unidirectional, in this case on an uplink between terminals and an access network of said system.

The terminals transmit uplink messages that are collected by base stations of the access network, without having to associate themselves beforehand with one or more base stations of the access network. In other words, the uplink messages transmitted by a terminal are not intended for a specific base station of the access network, and the terminal transmits its uplink messages on the assumption that they will be able to be received by at least one base station. Such arrangements are advantageous in that the terminal does not need to carry out regular measurements, these being intensive in particular from a power consumption point of view, in order to determine the most suitable base station for receiving its uplink messages. The complexity hinges on the access network, which must be capable of receiving uplink messages that are able to be transmitted at arbitrary instants and on arbitrary center frequencies. Each base station of the access network receives uplink messages from the various terminals that are within its range.

Such a mode of operation, in which the data exchanges are essentially unidirectional, is entirely satisfactory for many applications, such as for example the remote reading of gas, water and electricity meters, the remote monitoring of buildings or of houses, etc.

In some applications, however, it may be advantageous also to be able to carry out data exchanges in the other direction, namely on a downlink from the access network to the terminals.

In particular, it may be advantageous to transmit broadcast or multicast signals to the terminals. In particular, a plurality of frequency bands may be possible for the transmission of the uplink messages, which frequency bands are for example associated respectively with different geographical regions that may be subject to different regulatory constraints. The transmission of broadcast signals could then enable the terminals to identify the frequency band of the uplink in the geographical region in which they are located, before transmitting uplink messages in a frequency band not provided for this purpose. For example, it would be possible to transmit the broadcast signals in the frequency band of the uplink or in a frequency band having a predefined frequency gap with respect to the frequency band of the uplink.

Such broadcast signals could also be used to transmit any type of information that may be useful for all of the terminals, or for a large number of them.

Examples of broadcast signals are described, in the context of an LTE ("Long Term Evolution") wireless communication system, by the document WO 2015/043779 A1.

However, in a UNB wireless communication system, the broadcast signals must be able to be received in a simple and economical manner, in order to limit the cost of manufacturing the terminals. In particular, it is desirable for the broadcast signals to be able to be received by terminals equipped with low-performance frequency synthesis means, which is not the case for the broadcast signals described by the document WO 2015/043779 A1.

OBJECT AND SUMMARY OF THE INVENTION

The object of the present invention is to overcome all or some of the limitations of the solutions of the prior art, in particular those outlined above, by providing a solution that makes it possible to limit the complexity of the reception of the broadcast signals.

To this end, and according to a first aspect, the invention relates to a method for transmitting a broadcast signal, using an access network, to a plurality of terminals of a bidirectional wireless communication system, said transmission method including:

forming an information signal SI1 from broadcast information destined for said terminals,
forming a pilot signal SP,
transmitting a broadcast signal including the information signal SI1 and the pilot signal SP, said information signal SI1 and said pilot signal SP being transmitted on different respective center frequencies having a predetermined frequency gap $\Delta F1$.

Thus, according to the invention, the broadcast signal includes an information signal SI1 and a pilot signal SP, transmitted with a predetermined frequency gap $\Delta F1$ with respect to said information signal SI1, that is known a priori by the terminals that wish to extract the broadcast information contained in said information signal SI1. This predetermined frequency gap $\Delta F1$ forms a signature that is characteristic of said broadcast signal, which signature can be detected in a simple manner by these terminals.

In particular, non-linear filtering of the broadcast signal will form a plurality of replicas of the information signal SI1 and of the pilot signal SP on frequencies that depend on the center frequencies on which said information signal SI1 and said pilot signal SP have been transmitted. In particular, non-linear filtering having a quadratic effect will form a replica of the information signal SI1 on the frequency $\Delta F1$.

The accuracy of the center frequency $\Delta F1$ of the information signal SI1 depends mainly on the accuracy of synthesis of the transmission center frequencies at the access network level. Furthermore, since the center frequency $\Delta F1$ may be chosen so as to be much lower than the transmission center frequencies, said center frequency ΔF1 is also able to be synthesized with good accuracy by the terminals, including with low-performance frequency synthesis means.

In particular modes of implementation, the transmission method may furthermore include one or more of the following features, taken alone or in any technically feasible combination.

In particular modes of implementation, the broadcast signal transmission method includes forming another information signal SI2, said information signal SI2 being transmitted on a center frequency having a predetermined frequency gap ΔF2 with respect to the center frequency of the pilot signal SP, the frequency gap ΔF2 being different from the frequency gap ΔF1.

In particular modes of implementation, the information signal SI2 is formed from the same broadcast information as that of the information signal SI1.

In particular modes of implementation, the information signal SI2 is formed from broadcast information different from that of the information signal SI1.

In particular modes of implementation, the information signal SI1 and the information signal SI2 are formed according to different respective physical layer protocols.

In particular modes of implementation, the information signal SI1 and the information signal SI2 are formed according to different modulations.

In particular modes of implementation, the respective center frequencies of the pilot signal SP and of each information signal vary over time, the frequency gap between the center frequency of the pilot signal SP and the center frequency of each information signal being constant over time.

In particular modes of implementation, the pilot signal SP is a sinusoidal signal.

In particular modes of implementation, the frequency gap ΔF1 is less than 10 kilohertz, preferably less than 1 kilohertz.

In particular modes of implementation, the information signal SI1 is ultra-narrowband.

In particular modes of implementation, the information signal SI1 has a spectral width less than twice the frequency gap ΔF1.

According to a second aspect, the present invention relates to a base station including means configured to implement a broadcast signal transmission method according to any one of the modes of implementation of the invention.

According to a third aspect, the present invention relates to an access network including means configured to implement a broadcast signal transmission method according to any one of the modes of implementation of the invention.

According to a fourth aspect, the present invention relates to a method for receiving, using a terminal, a broadcast signal transmitted in accordance with a transmission method according to any one of the modes of implementation of the invention, said reception method including:
  non-linear filtering of a signal received by the terminal,
  searching for a broadcast signal on the basis of a signal obtained, after non-linear filtering of the received signal, on the frequency ΔF1, a broadcast signal being detected when said signal obtained on the frequency ΔF1 satisfies a predefined detection criterion,
  extracting the broadcast information from the detected broadcast signal.

In particular modes of implementation, the reception method may furthermore include one or more of the following features, taken alone or in any technically feasible combination.

In particular modes of implementation, the extraction of the broadcast information from the detected broadcast signal is performed on the basis of the signal obtained, after non-linear filtering, on the frequency ΔF1.

In particular modes of implementation, the non-linear filtering includes amplifying the received signal by way of a saturated amplifier or detecting the envelope of the received signal by way of an envelope detector circuit.

In particular modes of implementation, the extraction of the broadcast information includes the open-loop generation of a sinusoidal signal of frequency ΔF1 and the multiplication of the signal obtained after non-linear filtering by said sinusoidal signal of frequency ΔF1.

According to a fifth aspect, the present invention relates to a terminal including means configured to implement a broadcast signal reception method according to any one of the modes of implementation of the invention.

BRIEF DESCRIPTION OF THE DRAWINGS

The invention will be better understood on reading the following description, given by way of wholly non-limiting example and made with reference to the figures, in which.

In these figures, identical references from one figure to another denote identical or analogous elements. For the sake of clarity, the elements shown are not to scale, unless stated otherwise.

DETAILED DESCRIPTION OF EMBODIMENTS

Figure 1:
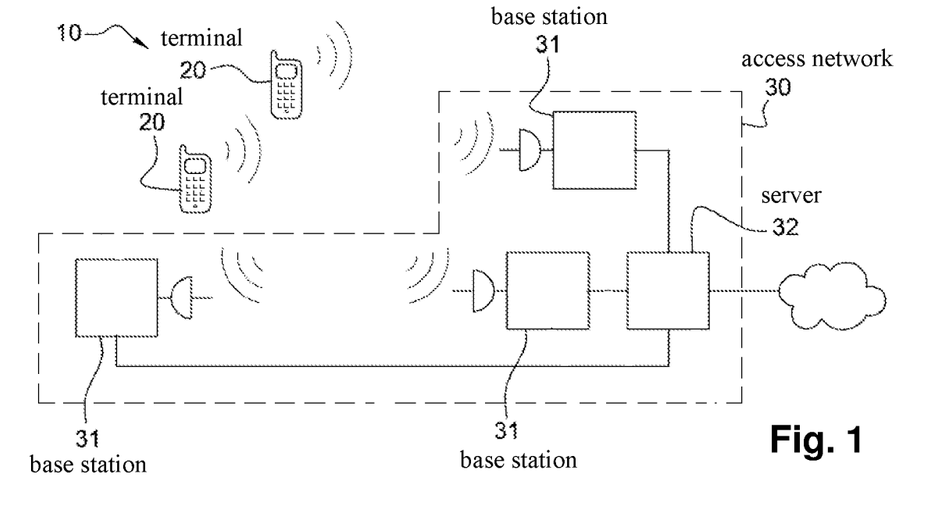
FIG. 1 shows a schematic depiction of a wireless communication system.

FIG. 1 schematically shows a wireless communication system 10, for example of UNB type, including a plurality of terminals 20 and an access network 30 including a plurality of base stations 31.

The terminals 20 and the base stations 31 of the access network 30 exchange data in the form of radio signals. The term "radio signal" is understood to mean an electromagnetic wave propagating via non-wired means, the frequencies of which are contained within the traditional radio wave spectrum (a few hertz to several hundred gigahertz).

The terminals 20 are designed to transmit uplink messages on an uplink to the access network 30.

Each base station 31 is designed to receive the uplink messages from the terminals 20 that are situated within its range. Each uplink message thus received is for example transmitted to a server 32 of the access network 30, possibly accompanied by other information such as an identifier of the base station 31 that received it, the measured power of said received uplink message, the date of reception and/or the measured center frequency of said received uplink message, etc. For example, the server 32 processes all of the uplink messages received from the various base stations 31.

In the present case, the UNB wireless communication system 10 is bidirectional, and the access network 30 is also designed to transmit, by way of the base stations 31, broadcast signals on a downlink to terminals 20, which terminals are designed to receive said signals. The broadcast signals may be broadcast signals and/or multicast signals.

Such broadcast signals include digital information, termed "broadcast information", destined for all or some of the terminals 20. The broadcast information may be any type of information that may be useful for all of the terminals 20 or for a group of terminals 20. For example, the broadcast information aims to control the operation of the terminals 20, for example for the transmission of uplink messages on the uplink. In particular, if a plurality of frequency bands are possible for the transmission of the uplink messages, then the broadcast signals may include control information enabling the terminals to identify the frequency band in which they have to transmit their uplink messages. In another non-limiting example, it is also possible to transmit control information making it possible to time-synchronize the various terminals 20 with one another, for example control information corresponding to the time in UTC (Coordinated Universal Time).

The broadcast signals transmitted by the base stations 31 are for example of limited duration, for example between a few hundred milliseconds and a few seconds. If necessary, the transmission of the broadcast signal is discontinuous, and a base station 31 transmits, for example, a broadcast signal in a recurring manner, the broadcast information being able to vary from one transmission to another. However, in other examples, there is nothing to rule out having a broadcast signal transmitted in a continuous manner by a base station 31.

The present invention relates in particular to a method 50 for transmitting a broadcast signal using the access network 30, and to a method 60 for receiving a broadcast signal using a terminal 20.

A) Broadcast Signal Transmission Method

Figure 2:
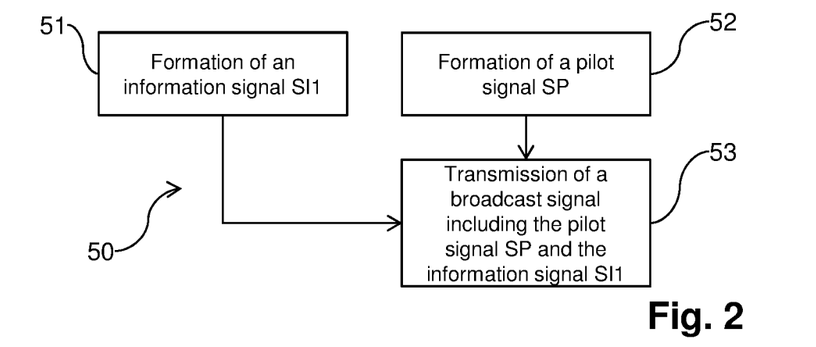
FIG. 2 shows a diagram illustrating the main steps of a method for transmitting a broadcast signal.

FIG. 2 schematically depicts the main steps of a method 50 for transmitting a broadcast signal using the access network 30.

As illustrated by FIG. 2, the transmission method 50 mainly includes the following steps, which will be described in more detail hereinafter:
- 51 forming an information signal SI1 from broadcast information destined for a plurality of terminals 20,
- 52 forming a pilot signal SP,
- 53 transmitting a broadcast signal including the information signal SI1 and the pilot signal SP, said information signal SI1 and said pilot signal SP being transmitted on different respective center frequencies having a predetermined frequency gap $\Delta F1$.

Among the various steps illustrated by FIG. 2, only the step 53 of transmitting the broadcast signal must necessarily be executed at least partially by a base station 31. The other steps illustrated by FIG. 2 may be executed by a base station 31 and/or by the server 32 of the access network 30. For example, the step 51 of forming the information signal SI1 and the step 52 of forming the pilot signal SP may be executed by the server 32, which then transmits the information signal SI1 and the pilot signal SP to a base station 31 that transmits the broadcast signal during the transmission step 53.

In the remainder of the description, we consider the case where the steps illustrated by FIG. 2 are all executed by the base stations 31 of said access network 30. It should be noted, however, that the broadcast information from which a base station 31 forms the information signal SI1 may nevertheless be provided by the server 32.

The base stations 31 include, for example, respective processing modules (not shown in the figures), each processing module including, for example, one or more processors and memory storage means (magnetic hard disk, electronic memory, optical disk, etc.) in which a computer program product, in the form of a set of program code instructions to be executed in order to implement the various steps of the broadcast signal transmission method 50, is stored in memory. In one variant, each processing module includes one or more programmable logic circuits, of FPGA, PLD, etc. type, and/or specialized integrated circuits (ASIC) designed to implement all or some of said steps of the broadcast signal transmission method 50.

Each base station 31 furthermore includes wireless communication means, considered as being known to those skilled in the art, enabling said base station to receive uplink messages and to transmit broadcast signals in the form of radio signals.

In other words, the base stations 31 of the access network 30 include respective means that are configured by software (specific computer program product) and/or hardware (FPGA, PLD, ASIC, etc.) in order to implement the various steps of the broadcast signal transmission method 50.

The information signal SI1 is formed from the broadcast information, during the formation step 51, in a conventional manner. For example, the broadcast information may be encoded by way of an error correcting code, and control information may be added, such as a time-synchronization pattern, error detection data (for example a cyclic redundancy check (CRC)), an identifier of a group of terminals 20 in the case of a multicast, etc. The data thus obtained may then be modulated using any method known to those skilled in the art, for example using BPSK ("Binary Phase Shift Keying") or GFSK ("Gaussian Phase Shift Keying") modulation, etc.

The pilot signal SP is intended to be transmitted, in the broadcast signal, with a predetermined non-zero frequency gap $\Delta F1$ with respect to the information signal SI1. This frequency gap $\Delta F1$, which is known a priori to the terminals 20, forms a signature that is characteristic of said broadcast signal, and the main function of the pilot signal SP is to create the frequency gap $\Delta F1$ in the broadcast signal.

Consequently, the pilot signal SP may be particularly simple and takes the form, in preferred modes of implementation, of a sinusoidal signal ("Continuous Wave" or CW). However, in other examples, there is nothing to rule out having a more complex pilot signal SP. In particular, the pilot signal SP may, in other examples, be formed solely from data known a priori to the terminals 20, or even be formed from a portion of the broadcast information destined for the terminals 20.

In the remainder of the description, we consider, in a non-limiting manner, the case where the pilot signal SP is a sinusoidal signal CW.

As indicated above, the information signal SI1 and the pilot signal SP are transmitted, during step 53, on different respective center frequencies having a predetermined non-zero frequency gap $\Delta F1$ that is known a priori to the terminals 20. It should be noted that the frequency gap $\Delta F1$ may be constant over time, or may vary over time, provided that said gap is known a priori to the terminals 20. For example, the frequency gap $\Delta F1$ may successively adopt, from one transmission to another, a plurality of predefined values, all known a priori to the terminals 20. In the remainder of the description, we consider, in a non-limiting manner, the case where the frequency gap $\Delta F1$ is constant over time.

Figure 3:
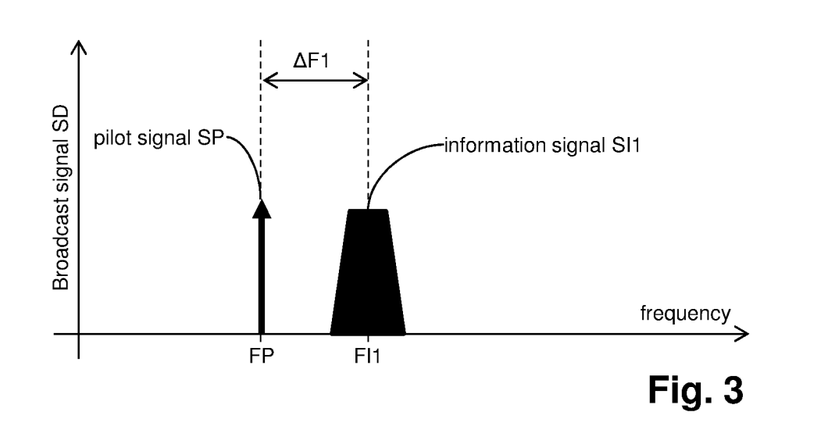
FIG. 3 shows a schematic depiction, in the frequency domain, of an example of a broadcast signal transmitted according to the transmission method of FIG. 2.

FIG. 3 schematically shows, in the frequency domain, a non-limiting example of a broadcast signal in accordance with the invention.

In the example illustrated by FIG. 3, the center frequency FI1 on which the information signal SI1 is transmitted and the center frequency FP on which the pilot signal SP is transmitted (that is to say the frequency of the sinusoidal signal W) are linked by the following expression:

$$FI1 = FP + \Delta F1$$

It should be noted that the center frequencies FI1 and FP are high, typically greater than several megahertz, or even greater than several hundred megahertz. For example, the center frequencies FI1 and FP are contained within the ISM ("Industrial, Scientific and Medical") band.

By contrast, the frequency gap $\Delta F1$ is preferably much lower than the center frequencies FI1 and FP. In particular modes of implementation, the frequency gap $\Delta F1$ is less than 10 kilohertz, or even less than 1 kilohertz. Such arrangements are advantageous in that they make it possible to limit the spectral width of the broadcast signal (and therefore the width of the frequency band in which a terminal 20 has to search for the broadcast signal), on the one hand, and to enable the reception of the broadcast signal using low-performance frequency synthesis means, as described hereinafter, on the other hand.

In the example illustrated by FIG. 3, the information signal SI1 has a spectral width less than twice the frequency gap $\Delta F1$. For example, the spectral width of the information signal is of the order of 100 hertz, and the frequency gap $\Delta F1$ is equal to 200 hertz. Such arrangements make it possible to facilitate the reception of the broadcast signal. However, in other examples, there is nothing to rule out having an information signal SI1 having a spectral width greater than twice the frequency gap $\Delta F1$.

The center frequency FI1 of the information signal SI1 and the center frequency FP of the pilot signal SP are, for example, constant over time. However, in such a case, the broadcast signal is not very resistant to the presence of interference.

To improve the resistance to interference, the center frequencies FP and FI1 of the pilot signal SP and of the information signal SI1 vary over time within a predefined frequency band. By contrast, the frequency gap $\Delta F1$ between the center frequency FP of the pilot signal SP and the center frequency FI1 of the information signal SI1 remains preferably constant over time. In other words:

$$FI1(t) = FP(t) + \Delta F1$$

The time variation of the center frequencies FP and FI1 is, for example, continuous. In a first example, the variation of the center frequencies FP and FI1 is sinusoidal, for example in accordance with the following expressions:

$$FP(t) = F_0 + A_0 \cdot \sin(\omega_0 \cdot t)$$

$$FI1(t) = FP(t) + \Delta F1$$

in which expressions:
$F_0$ corresponds to a predefined reference frequency,
$A_0$ corresponds to a predefined variation amplitude,
$\omega_0$ corresponds to a predefined variation pulse.

Consequently, the center frequency FP of the pilot signal SP varies within a predefined frequency band BP having a lower bound FP1 and an upper bound FP2. In the example above, the frequency FP1 is equal to $(F_0 - A_0)$ and the frequency FP2 is equal to $(F_0 + A_0)$. It should be noted that, unlike the frequency gap $\Delta F1$, the reference frequency $F_0$, the variation amplitude $A_0$ and the variation pulse $\omega_0$ need not be known to the terminals 20. However, in order to limit the complexity of said terminals 20, it may prove advantageous for the frequency band BP to be known to the terminals or to be able to be determined by them.

In a second non-limiting example, the variation of the center frequencies FP and FI1 is linear, for example in accordance with the following expressions:

$$FP(t) = F_0 + \delta F \cdot t$$

$$FI1(t) = FP(t) + \Delta F1$$

in which expressions $\delta F$ corresponds to a predefined variation slope.

In the previous expressions, the center frequency FP of the pilot signal SP is preferably kept within the frequency band BP. For example, if the variation slope $\delta F$ is positive, then the center frequency FP increases gradually from the frequency FP1 to the frequency FP2. When the center frequency FP reaches the frequency FP2, it starts to increase again from the frequency FP1, etc.

In other examples, the time variation of the center frequencies FP and FI1 may be discontinuous. If necessary, the center frequency FP and FI1 follow predefined frequency hop patterns, for example. It should be noted that, unlike the frequency gap $\Delta F1$, the frequency hop patterns need not be known to the terminals 20. However, it may prove advantageous for the frequency band BP to be known to the terminals or to be able to be determined by them.

Figure 4:
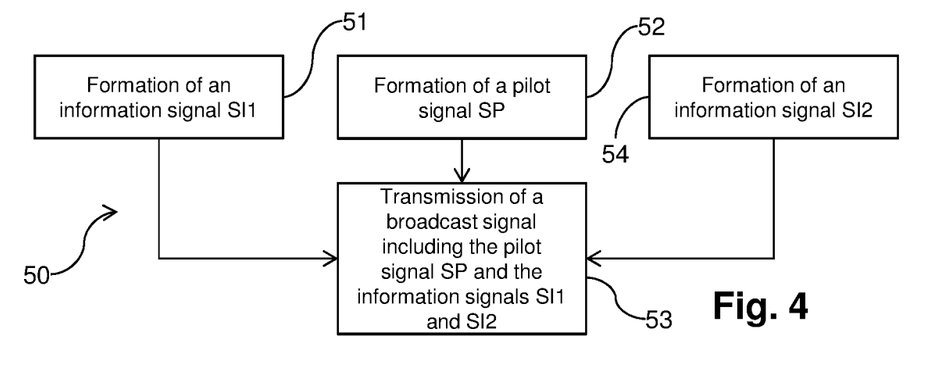
FIG. 4 shows a diagram illustrating the main steps of a variant embodiment of the transmission method of FIG. 2.

FIG. 4 schematically shows one particular mode of implementation of a broadcast signal transmission method 50. In addition to the steps already described with reference to FIG. 3, the transmission method 50 illustrated by FIG. 4 includes a step 54 of forming another information signal SI2. The transmitted broadcast signal includes the pilot signal SP and the information signals SI1 and SI2, and said information signal SI2 is transmitted on a center frequency FI2 having a predetermined frequency gap $\Delta F2$ with respect to the center frequency FP of the pilot signal SP, the frequency gap $\Delta F2$ being different from the frequency gap $\Delta F1$. Like the frequency gap $\Delta F1$, the frequency gap $\Delta F2$ may be constant over time, or vary over time, provided that said gap is known a priori to the terminals 20. In the remainder of the description, we consider, in a non-limiting manner, the case where the frequency gap $\Delta F2$ is constant over time.

Figure 5:
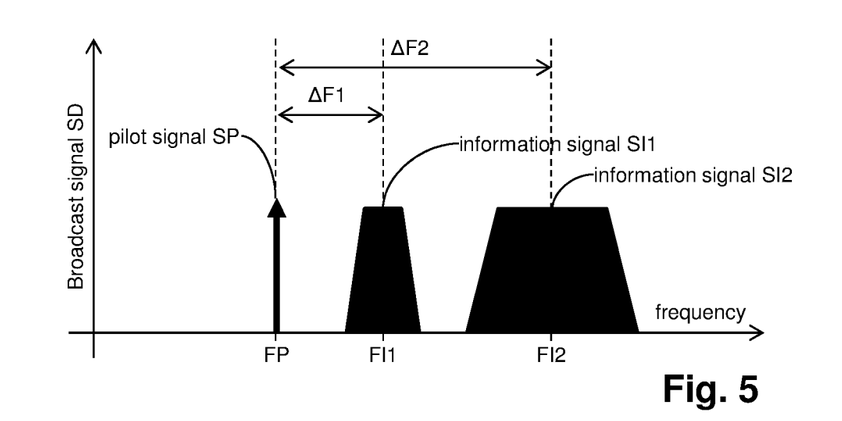
FIG. 5 shows a schematic depiction, in the frequency domain, of an example of a broadcast signal transmitted according to the transmission method of FIG. 4.

FIG. 5 schematically shows, in the frequency domain, a non-limiting example of a broadcast signal including the pilot signal SP, the information signal SI1 and the information signal SI2, in which the center frequency FP of the pilot signal SP and the center frequency FI2 of the information signal SI2 are linked by the following expression:

$$FI2 = FP + \Delta F2$$

In the non-limiting example illustrated by FIG. 5, the frequency gaps $\Delta F1$ and $\Delta F2$ are both positive, and the frequency gap $\Delta F2$ is greater than the frequency gap $\Delta F1$. For example, the frequency gap $\Delta F1$ is equal to 200 hertz, and the frequency gap $\Delta F2$ is equal to 700 hertz. Furthermore, the information signal SI1 and the information signal SI2 do not have any overlap between them in the frequency domain.

More generally, what has been described above for the frequency gap ΔF1 is also applicable to the frequency gap ΔF2. In particular, in the case where the center frequencies FP and FI1 of the pilot signal SP and of the information signal SI1 vary over time, then the center frequency FI2 of the information signal SI2 also varies over time, preferably such that the frequency gap ΔF2 remains constant.

There are several possible uses for the information signal SI2.

For example, the information signal SI2 may be identical to the information signal SI1. In such a case, the information signal SI2 is transmitted mainly for redundancy purposes, for example in order to improve the resistance of the broadcast signal to interference, alternatively or in addition to the time variation of the center frequencies of the pilot signal SP and of the information signals SI1 and SI2.

In another example, the information signal SI2 may be different from the information signal SI1. For example, the information signal SI2 may be formed from broadcast information different from that used to form the information signal SI1.

Alternatively or in addition to the use of different broadcast information, the information signal SI2 may be formed according to a physical layer protocol different from that used to form the information signal SI1. The term "different physical layer protocol" is understood to mean that the broadcast signal SI2 is different from the information signal SI1 even when the broadcast information is the same. For example, the information signal SI1 and the information signal SI2 may differ in their bit rate, in their error correcting code, in their control information, etc. In the non-limiting example illustrated by FIG. 5, the information signal SI2 has a spectral width greater than that of the information signal SI1, for example equal to 600 hertz.

In such a case, the information signal SI1 is for example intended for a first group of terminals 20 that are compatible with a first physical layer protocol, and the information signal SI2 is intended for a second group of terminals 20 that are compatible with a second physical layer protocol.

In preferred modes of implementation, the information signal SI1 and the information signal SI2 differ at least in the modulation used. For example, one of said information signals is modulated using BPSK modulation and the other of said information signals is modulated using GFSK modulation.

It should be noted that, if the uplink messages transmitted by the terminals 20 are ultra-narrowband in a UNB wireless communication system, the broadcast signals themselves are not necessarily ultra-narrowband and may have an instantaneous spectral width greater than one kilohertz. In preferred modes of implementation, the information signal SI1 is ultra-narrowband. Preferably, in the case where the broadcast signal includes a plurality of information signals, each of said information signals is ultra-narrowband.

B) Broadcast Signal Reception Method

In general, many reception methods are able to be used to receive the broadcast signal, and more particularly to detect the broadcast signal and/or extract the broadcast information from the information signal SI1 (and, if necessary, from the information signal SI2).

However, due to the particular shape of the broadcast signal, in particular the predetermined frequency gap ΔF1 between the pilot signal SP and the information signal SI1, the broadcast signal can be received in a simple and economical manner.

Figure 6:
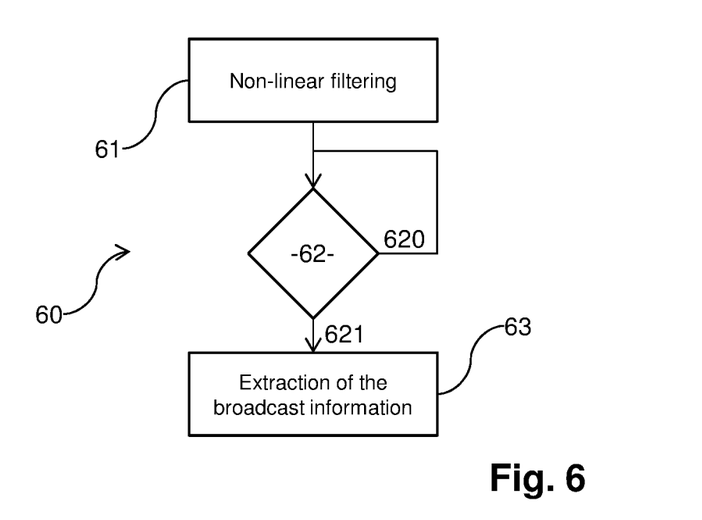
FIG. 6 shows a diagram illustrating the main steps of a method for receiving a broadcast signal.

FIG. 6 schematically shows the main steps of a method 60 for receiving, using a terminal 20, a broadcast signal transmitted by the access network 30 in accordance with what has been described above.

For example, each terminal 20 includes a processing module (not shown in the figures), including one or more processors and memory storage means (magnetic hard disk, electronic memory, optical disk, etc.) in which a computer program product, in the form of a set of program code instructions to be executed in order to implement the various steps of the broadcast signal reception method 60, is stored in memory. In one variant, the processing module includes one or more programmable logic circuits, of FPGA, PLD, etc. type, and/or specialized integrated circuits (ASIC) designed to implement all or some of said steps of the broadcast signal reception method 60. Each terminal 20 furthermore includes wireless communication means, considered as being known to those skilled in the art, enabling said terminal to transmit uplink messages and to receive downlink messages in the form of radio signals.

In other words, each terminal 20 includes a set of means that are configured by software (specific computer program product) and/or hardware (FPGA, PLD, ASIC, etc.) in order to implement the various steps of the broadcast signal reception method 60.

As illustrated by FIG. 6, the broadcast signal reception method 60 includes, firstly, a step 61 of non-linear filtering of the signal received by the terminal 20.

The term "non-linear filtering" is understood to mean filtering having a substantially quadratic effect, that is to say the output signal of which comprises the input signal squared. Specifically, if we consider, for example, the following expressions for the pilot signal SP and for the information signal SI1:

$$SP(t) = \sin(\omega_{FP} \cdot t)$$

$$SI1(t) = A_{SI1}(t) \cdot \sin(\omega_{FI1} \cdot t)$$

in which expressions:
$\omega_{FP}$ corresponds to the pulse associated with the center frequency FP,
$A_{SI1}(t)$ corresponds to the baseband information signal SI1($t$),
$\omega_{FI1}$ corresponds to the pulse associated with the center frequency FI1.

The broadcast signal SD is then equal to:

$$SD(t) = \sin(\omega_{FP} \cdot t) + A_{SI1}(t) \cdot \sin(\omega_{FI1} \cdot t)$$

After non-linear filtering, the signal obtained comprises the broadcast signal SD squared:

$$\begin{aligned}(SD(t))^2 &= (\sin(\omega_{FP} \cdot t) + A_{SI1}(t) \cdot \sin(\omega_{FI1} \cdot t))^2 \\ &= (\sin(\omega_{FP} \cdot t) + (A_{SI1}(t) \cdot \sin(\omega_{FI1} \cdot t))^2 + 2(\sin(\omega_{FP} \cdot t) \cdot \\ &\quad A_{SI1}(t) \cdot \sin(\omega_{FI1} \cdot t)) \\ &= (1 - \cos(2 \cdot \omega_{FP} \cdot t))/2 + (A_{SI1}(t))^2 \cdot \\ &\quad (1 - \cos(2 \cdot \omega_{FI1} \cdot t))/2 + A_{SI1}(t) \cdot \\ &\quad (\cos(\omega_{FP} \cdot t - \omega_{FI1} \cdot t) - \cos(\omega_{FP} \cdot t + \omega_{FI1} \cdot t)) \\ &= (1 + A_{SI1}(t)^2)/2 + A_{SI1}(t) \cdot \cos(\omega_{\Delta F1} \cdot t) - \\ &\quad \cos(2 \cdot \omega_{FP} \cdot t)/2 - (A_{SI1}(t))^2 \cdot \cos(2 \cdot \omega_{FI1} \cdot t)/ \\ &\quad 2 - A_{SI1}(t) \cdot \cos(\omega_{FP} \cdot t + \omega_{FI1} \cdot t)\end{aligned}$$

in which expression $\omega_{\Delta F1}$ corresponds to the pulse associated with the frequency gap $\Delta F1$.

Consequently, the signal obtained after non-linear filtering includes, among other components, the following component:

$$A_{SI1}(t) \cdot \cos(\omega_{\Delta F1} \cdot t)$$

which corresponds to the information signal SI1 on the frequency $\Delta F1$. The other components obtained may possibly, if necessary, be suppressed in whole or in part by suitable filtering.

Consequently, by virtue of the non-linear filtering and of the particular shape of the broadcast signal, the information signal SI1 is returned to a frequency $\Delta F1$. The non-linear filtering may, for example, be performed by way of a saturated amplifier or by way of an envelope detector circuit, and may consequently be performed in a simple and economical manner.

It should be noted that the signal supplied at the input of the non-linear filter corresponds to a signal measured in a frequency band containing the broadcast signal SD. This measured signal may possibly be frequency-translated to lower frequencies without impairing the reception of the broadcast signal, since the frequency gap $\Delta F1$ is not changed by such a frequency translation.

Next, the reception method 60 includes a step 62 of searching for a broadcast signal on the basis of the signal obtained, after non-linear filtering, on the frequency $\Delta F1$. The search for a broadcast signal consists in checking whether the signal obtained on the frequency $\Delta F1$ satisfies a predefined detection criterion. For example, the detection criterion can be considered to be satisfied if the energy received on the frequency $\Delta F1$ is greater than a predefined threshold value. In another non-limiting example, it is possible to return the signal obtained on the frequency $\Delta F1$ to baseband and to correlate it with a predefined time-synchronization pattern contained in the information signal SI1, the detection criterion being considered as being satisfied if the result of the correlation exceeds a predefined threshold value.

The execution of the search step 62 continues for as long as no broadcast signal is detected (reference 620 in FIG. 6). When a broadcast signal is detected (reference 621 in FIG. 6), then the reception method 60 includes a step 63 of extracting the broadcast information contained in the information signal SI1.

It should be noted that, once a broadcast signal has been detected on the basis of the signal obtained after non-linear filtering, the extraction can be performed from the information signal SI1 on the center frequency F11, before non-linear filtering. However, it may prove necessary, in such a case, to have relatively high-performance frequency synthesis means.

In preferred modes of implementation, the broadcast information of the detected broadcast signal is extracted from the information signal SI1 obtained, after non-linear filtering, on the frequency $\Delta F1$. Such arrangements are very advantageous insofar as the extraction of the broadcast information can be performed with low-performance frequency synthesis means. Specifically, the frequency $\Delta F1$ is accurate in principle (generated by the base stations 31) and may be chosen to be low, for example of the order of a few hundred hertz. Consequently, even with low-performance frequency synthesis means, the drift of the frequency $\Delta F1$ generated by the terminal 20 is in principle negligible over a period of a few seconds to a few minutes. For example, extracting the broadcast information involves the open-loop generation of a sinusoidal signal of frequency $\Delta F1$, and the multiplication of the signal obtained after non-linear filtering by said sinusoidal signal of frequency $\Delta F1$. However, there is nothing to rule out generating said sinusoidal signal of frequency $\Delta F1$ in closed-loop mode, for example by way of a PLL, of a Costas loop, etc.

In the case where the broadcast signal SD furthermore includes an information signal SI2, and in the case where the reception of the broadcast signal SD includes a non-linear filtering step, then the frequency gap $\Delta F1$ and the frequency gap $\Delta F2$ are preferably chosen so as to ensure that, after non-linear filtering, the information signal SI1 and the information signal SI2, returned to the frequency $\Delta F1$ and the frequency $\Delta F2$, respectively, are not disturbed excessively by other components.

For example, by using B1 to denote the spectral width of the information signal SI1 and B2 to denote the spectral width of the information signal SI2, it is then possible to choose the frequency gaps $\Delta F1$ and $\Delta F2$ such that the following expressions are satisfied (assuming $\Delta F2 > \Delta F1$):

$$B1 + B2/2 < \Delta F2 - 2 \cdot \Delta F1$$

$$B1/2 + B2 < \Delta F1$$

The above expressions make it possible to ensure, in the case of a purely quadratic effect of the non-linear filtering, that the information signal SI1 and the information signal SI2, obtained on the frequencies $\Delta F1$ and $\Delta F2$, do not exhibit frequency overlap with other components of the signal obtained after non-linear filtering.

If the non-linear filtering is not limited to a quadratic effect, then the frequency gaps $\Delta F1$ and $\Delta F2$ are preferably chosen such that the frequency gap $\Delta F2$ is not a harmonic of the frequency gap $\Delta F1$ (and vice versa if the frequency gap $\Delta F1$ is greater than the frequency gap $\Delta F2$).

More generally, it is possible to choose the frequency gaps $\Delta F1$ and $\Delta F2$ by simulating the non-linear filtering on a broadcast signal SD by varying the respective values of the frequency gaps $\Delta F1$ and $\Delta F2$ in order to ensure that the information signals SI1 and SI2, returned to the frequencies $\Delta F1$ and $\Delta F2$, respectively, are not disturbed excessively by the other components of the signal obtained after non-linear filtering.

More generally, it should be noted that the modes of implementation and embodiments considered above have been described by way of non-limiting example, and that other variants are therefore conceivable.

In particular, the invention has been described considering a broadcast signal including one or two information signals. In other examples, there is nothing to rule out considering a broadcast signal including a number of information signals greater than two, which may, if necessary, be transmitted on respective center frequencies having predetermined different respective frequency gaps with respect to the center frequency of the pilot signal SP that are known a priori to the terminals.

The invention claimed is:

1. A method for receiving, using a terminal, a broadcast signal transmitted by an access network of a bidirectional wireless communication system, wherein the broadcast signal comprises a pilot signal and an information signal SI1 formed from broadcast information destined for a plurality of terminals, the information signal SI1 and the pilot signal SP are transmitted on different respective center frequencies having a predetermined frequency gap $\Delta F1$, the reception method comprises steps of:

non-linear filtering of a signal received by the terminal;

searching for the broadcast signal from a signal obtained, after the non-linear filtering of the received signal, on the predetermined frequency gap $\Delta F1$, the broadcast signal being detectable when the signal obtained on the predetermined frequency gap $\Delta F1$ satisfies a predefined detection criterion; and extracting the broadcast information from the detected broadcast signal.

2. The method as claimed in claim 1, wherein the step of extracting the broadcast information performs the extraction on the signal obtained, after non-linear filtering, on the predetermined frequency gap $\Delta F1$.

3. A terminal to receive a broadcast signal transmitted by an access network of a bidirectional wireless communication system, the broadcast signal comprises a pilot signal and an information signal SI1 formed from broadcast information destined for a plurality of terminals, the information signal SI1 and the pilot signal SP are transmitted on different respective center frequencies having a predetermined frequency gap $\Delta F1$, the terminal comprises a processor configured to:

perform non-linear filtering of a signal received by the terminal;

search for the broadcast signal from a signal obtained, after non-linear filtering of the received signal, on the predetermined frequency gap $\Delta F1$, the broadcast signal being detectable when the signal obtained on the predetermined frequency gap $\Delta F1$ satisfies a predefined detection criterion; and extract the broadcast information from the detected broadcast signal.

\* \* \* \* \*